United States Patent [19]
Holleran et al.

[11] Patent Number: 5,932,044
[45] Date of Patent: Aug. 3, 1999

[54] METHOD OF FABRICATING A HONEYCOMB STRUCTURE

[75] Inventors: Louis M. Holleran, Big Flats, N.Y.; G. Daniel Lipp, Fort Collins, Colo.

[73] Assignee: Corning Incorporated, Corning, N.Y.

[21] Appl. No.: 08/933,762

[22] Filed: Sep. 23, 1997

Related U.S. Application Data

[60] Provisional application No. 60/029,256, Oct. 25, 1996, and provisional application No. 60/034,741, Jan. 13, 1997.

[51] Int. Cl.$^6$ .................................................. C04B 37/00
[52] U.S. Cl. ......................................................... 156/89.22
[58] Field of Search ................................... 264/605, 630; 156/89.22

[56] References Cited

U.S. PATENT DOCUMENTS

| | | |
|---|---|---|
| 3,112,184 | 11/1963 | Hollenbach . |
| 3,600,204 | 8/1971 | Beall et al. . |
| 3,885,977 | 5/1975 | Lachman et al. . |
| 4,127,691 | 11/1978 | Frost . |
| 4,353,854 | 10/1982 | Oyamada et al. ........................ 264/63 |
| 4,767,479 | 8/1988 | Ferguson et al. ......................... 156/89 |
| 5,403,787 | 4/1995 | Day . |

FOREIGN PATENT DOCUMENTS

| | | |
|---|---|---|
| 0 082 608 | 6/1983 | European Pat. Off. . |
| 2 530 178 | 1/1984 | France . |
| 62-009183 | 1/1987 | Japan . |

*Primary Examiner*—Christopher A. Fiorilla
*Attorney, Agent, or Firm*—L. Rita Herzfeld

[57] ABSTRACT

A method of fabricating a monolithic honeycomb structure product involves shaping a first mixture of raw materials and a binder into a green honeycomb, extruding a second mixture of raw materials and a binder into one or more green members that each define an opening extending longitudinally therethrough. The raw materials of the second mixture are compatible with the raw materials of the first mixture. The green honeycomb and member(s) are dried. The binders of the green honeycomb and member(s) are softened at the surfaces that are to be bonded. The green member(s) is inserted into the honeycomb and bonded to the honeycomb to form an assembly thereof, which is then dried and fired to form a unified monolithic honeycomb structure. The insertion is best carried out by mounting a member in the shape of a tube on a mandrel, and inserting the mandrel into the honeycomb opening to bond the tube to the honeycomb.

9 Claims, 3 Drawing Sheets

METHOD OF FABRICATING A HONEYCOMB STRUCTURE

This application claims the benefit of U.S. Provisional Application Ser. Nos. 60/029,256 filed Oct. 25, 1996 and 60/034,741 filed Jan. 13, 1997, entitled Method of Fabricating a Honeycomb Structure, by Louis M. Holleran and G. Daniel Lipp.

The Government of the United States of America has rights in this invention pursuant to Contract No. DEN3-336 awarded by the Department of Energy.

This invention relates to a method of fabricating a honeycomb structure having at least one opening extending longitudinally from one end to the other. The method involves providing a green honeycomb and extruding a green member having an opening, softening the joining surfaces of the honeycomb and the green member, and inserting the green member into the honeycomb, followed by drying and firing the resulting assembly to form a monolithic honeycomb having a sinter-joined bond between the honeycomb and the fired member.

BACKGROUND OF THE INVENTION

Ceramic regenerator wheels for turbine engines have been made for many years by a crimping and wrapping process, such as for example, disclosed in U.S. Pat. No. 3,112,184. For some applications, a relatively massive hub is required on the centerline of the wheel. The process developed for the wrapped wheels requires slip casting and firing a hub blank and cementing it into the fired hub with a foaming agent. This is an expensive process because it requires many steps. It also introduces a foreign material into the product, namely, the foam cement, that can have a slightly different thermal expansion than the rest of the wheel.

It would be desirable and an advancement in the art to have a process of fabricating such regenerator wheels that is more economical than the process described above and that produces a product having a strong stable bond and a uniform thermal expansion throughout.

The present invention provides such a process.

SUMMARY OF THE INVENTION

In accordance with one aspect of the invention, there is provided a method of fabricating a monolithic honeycomb structure product that involves shaping a first mixture of raw materials and a binder into a green honeycomb, extruding a second mixture of raw materials and a binder into one or more green members that each define an opening extending longitudinally therethrough. The raw materials of the second mixture are compatible with the raw materials of the first mixture. The green honeycomb and member(s) are dried. The binders of the green honeycomb and member(s) are softened at the surfaces that are to be bonded. The green member(s) is inserted into the honeycomb and bonded to the honeycomb to form an assembly thereof, which is then dried and fired to form a unified monolithic honeycomb structure product.

The insertion is best carried out by mounting a member in the shape of a tube on a mandrel, and inserting the mandrel into the honeycomb opening to bond the tube to the honeycomb.

DETAILED DESCRIPTION OF THE INVENTION

Figures 1, 1A, 1B:
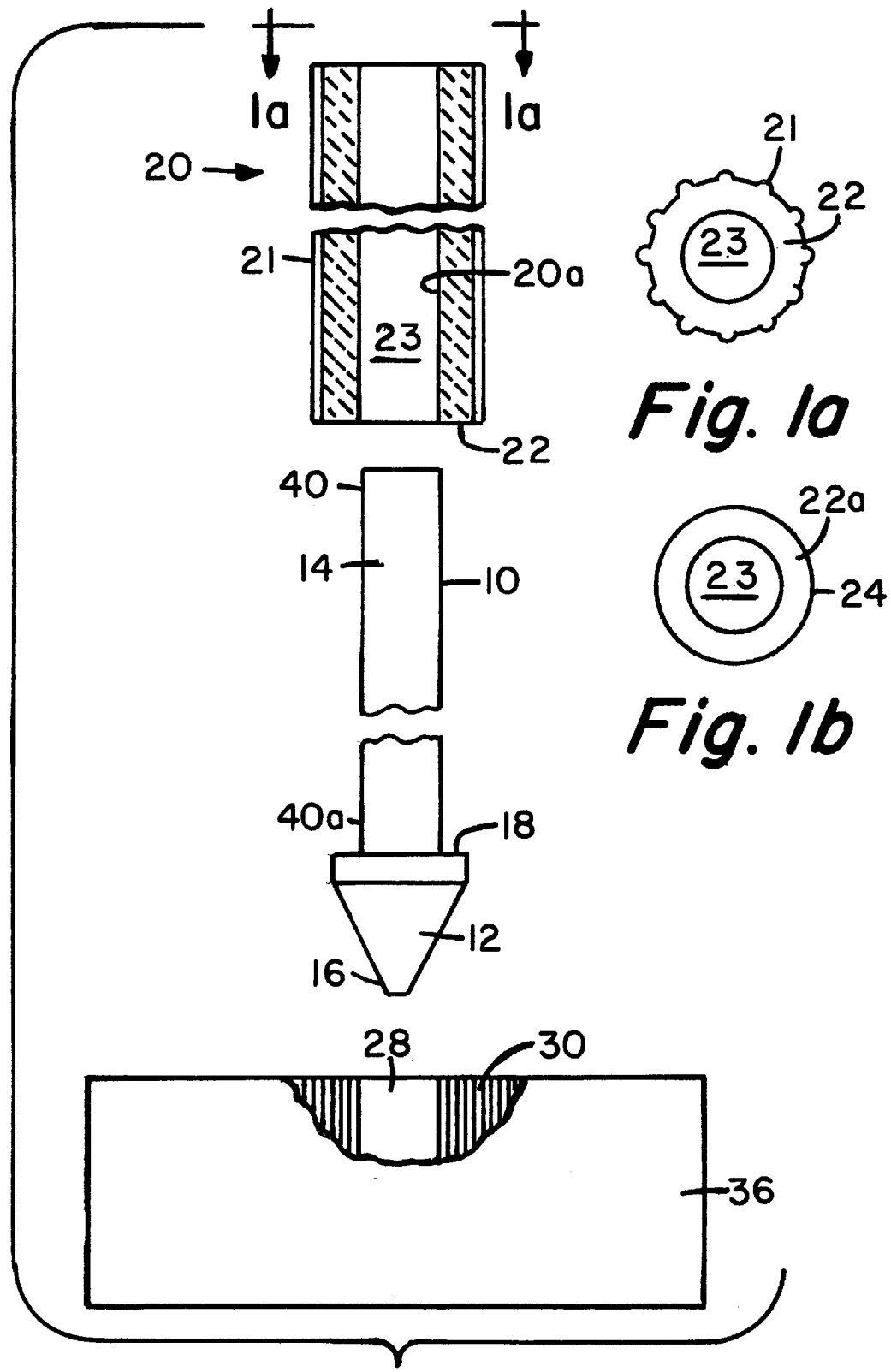
FIG. 1 is a schematic diagram showing a mandrel, tube, and honeycomb in which the tube is to be inserted.
FIG. 1a is a top plan view of a tube having ribs.
FIG. 1b is a top plan view of a tube having a smooth (non-ribbed) outer surface.

This invention relates to a process for fabricating a product honeycomb having at least one opening extending longitudinally from one end to the other. The honeycombs are made by inserting a green member which has an opening extending from one end to the other, into a green honeycomb (or honeycomb matrix) of compatible material, to form an assembly thereof. The resulting assembly is dried and fired to form the product honeycomb characterized by a sinter joined bond between the fired honeycomb and the fired member. This is a more economical process than the prior art multi-step process in which the member had to be cemented into the honeycomb matrix. Another advantage of this method is that the product honeycomb monolith can be made of one type of material, resulting in improved performance due to the uniformity of material properties.

A green honeycomb structure (or honeycomb matrix) is provided that is made of sinterable material such as ceramic, glass or glass-ceramic material, or material that when fired forms these materials. Some typical raw materials for fabrication of the honeycomb are clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride or mixtures of these. Raw materials for firing into cordierite or beta-spodumene are preferred.

Some ceramic batch material compositions for extruding into honeycombs are disclosed in U.S. Pat. Nos. 3,885,977 and 4,127,691 which are herein incorporated by reference as filed.

In accordance with a preferred embodiment, one raw material composition which ultimately forms cordierite upon firing is as follows in percent by weight, although it is to be understood that the invention , not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

Making of beta-spodumene bodies is described in U.S. Pat. Nos. 3,600,204 and 5,403,787 which are herein incorporated by reference as filed.

By honeycomb structure is meant a unitary body having a multitude of open ended cells or channels of predetermined size and shape such that each cell is defined by walls which separate the cells from one another.

The green honeycombs are provided by extrusion or wrapping processes well-known in the art from raw material mixtures having a plasticizing organic binder and a vehicle which is typically aqueous vehicle, e.g. water. The honeycombs can be extruded with or without an opening through which the member is to be inserted according to this invention. Also, openings can be drilled through already shaped honeycombs.

The plasticizing organic binder contributes to the plasticity of the mixture for extruding into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose binder having a thermal gel point of about 50° C., and a gel strength of 5000 g/cm$^2$ (based on a 2% solution at 65° C.). Methocel F4M, F240, and K75M are hydroxypropyl methylcellulose. Methocels F4M and F240 have thermal gel points of about 54° C. Methocel K75M has a gel point of about 70° C. (all based on a 2% solution in water)

Honeycombs too large to be shaped by extrusion can be made by what is called crimping or corrugating or folding, and wrapping processes that are well-known in the art. One such process is disclosed in U.S. Pat. No. 3,112,184 which is herein incorporated by reference. In this process, the raw material which will eventually be fired to form the honeycomb, and binders and solvents are coated onto a carrier.

The purpose of the binder is to bond the unfired material to the carrier to impart green strength to the coated carrier which aids in forming the honeycomb, and to retain the formed, unfired honeycomb in the desired shape after forming and prior to firing. Thus any material having the requisite, well-known characteristics of binders, such as natural materials like gum arabic colophony and shellac and synthetic organic resins like acrylic resins, methacrylate resins, alkyd resins, cellulose derivatives, coumaroneindene resins, epoxy resins, furan resins, phenolic resins, polyamides, polyesters, resorcinol resins, styrene resins, terpene resins, urea resins, vinyl resins, chlorinated paraffins, melamine resins, and inorganic binders such as sodium silicate, and silicone resins. Organic binders are preferred as they are removed by decomposition and volatilization when the article is fired to sinter the material. Furthermore, heat-curable organic binders are preferred over those that are hardened exclusively by solvent evaporation as it is easier to control curing temperature and time than the time-temperature relationship for solvent removal.

The purpose of the carrier is to provide support for the unfired coating to allow it to be formed to the desired shape prior to firing. Carriers that are suitable are inorganic materials including aluminum foil, tin foil, aluminum silicate paper, copper screening an asbestos cloth, and organic materials including cellulose acetate paper, onion skin paper, tea bag paper, nylon cloth, rayon cloth, and polyethylene film. The organic film materials are preferred as they substantially decompose upon firing the formed article and produce an article consisting almost entirely of sinterable material. The inorganic films on the other hand remain in the final article and decrease its usefulness for some purposes, for instance uses requiring thermal shock resistance, but in some instances beneficially react with the sinterable coating material during firing. Although films up to about 0.16 cm (¹⁄₁₆″) thick, both organic and inorganic, have been found suitable, the only advantage realized from using thick films is the slight reinforcing action of any retained inorganic film structure. Therefore it is preferred to use thinner films which will therefore result in thinner walls in the final honeycomb. It is preferred to use fibrous carriers, organic or inorganic. By fibrous carriers is meant those composed of a multitude of individual fibers so disposed as to form a sheet, such as cloth or paper containing a multitude of holes that pass through the carrier from one surface to the opposite surface which can be completely filled by the sinterable material-binder-vehicle slurry to produce an unlaminated wall on firing.

The sinterable material-binder-vehicle are applied to the carrier by any conventional technique such as spraying, dipping, or by brushing a suspension or slurry onto the carrier, or the binder and sinterable material can be applied separately and consecutively by any technique.

The coated carrier is then crimped. The crimping pattern will eventually be the shape of the honeycomb channels. Examples of simple patterns which are suitable are triangular, rectangular, square and sinusoidal, while more complex repeating patterns are also suitable. The crimped coated carrier is then shaped as desired to form the honeycomb. This is done preferably by winding the coated crimped carrier around itself to form what is called a wrapped or wheel structure. The honeycomb can be fabricated by winding or wrapping multiple layers of coated carriers with different patterns or to introduce alternate layers of flat coated carriers or sheets between crimped coated carriers. This latter method is especially suited in the production of the cylindrical shape.

The cell density of the honeycomb and cell wall thicknesses can vary. Typical cell densities are from about 15 cells/cm$^2$ (100 cells/in$^2$) to 188 cells/cm$^2$ (1200 cells/in$^2$). Typical wall thicknesses are 0.075 mm to 0.96 mm (about 3 to 40 mils).

The center of the wheel is the usual point of insertion of the member commonly referred to as a hub, according to this invention. The honeycomb is dried to remove the solvent.

The green member is fabricated by extrusion and has an opening. The most useful shape is a tube. Optionally the tube can have a number of projecting ribs, usually 12. It is believed that the ribs improve the bond strength and ability of the bond to transfer torsional stress from the honeycomb to the member. The ribs also aid in properly deforming the honeycomb cells during insertion and therefore promote good surface to surface contact. The length of the tube is typically the same as the length of the honeycomb, i.e. the length of the channels, or longer, so that when inserted into the honeycomb it will extend the entire length of the honeycomb from one end to the other. If initially longer than the honeycomb, the member can be finished by grinding or other means if a flat surface is desired.

The member is made of materials that are compatible with those of the honeycomb. By compatible is meant that the materials are such that the green honeycomb and green member can be processed at the same time without varying processing parameters, e.g. firing conditions, etc., to result in similar properties, e.g. thermal expansion, to form a stable bond between the member and the honeycomb allowing it to hold together as a strong unified structure. It is preferred that the member and honeycomb be made from similar batch compositions, and most preferably identical batch compositions so that the materials of the fired assembly be identical in composition throughout for maximum stability and uniformity. It is preferred that both honeycomb and member be made either from cordierite raw material batches or beta-spodumene raw material batches.

Figure 4A:
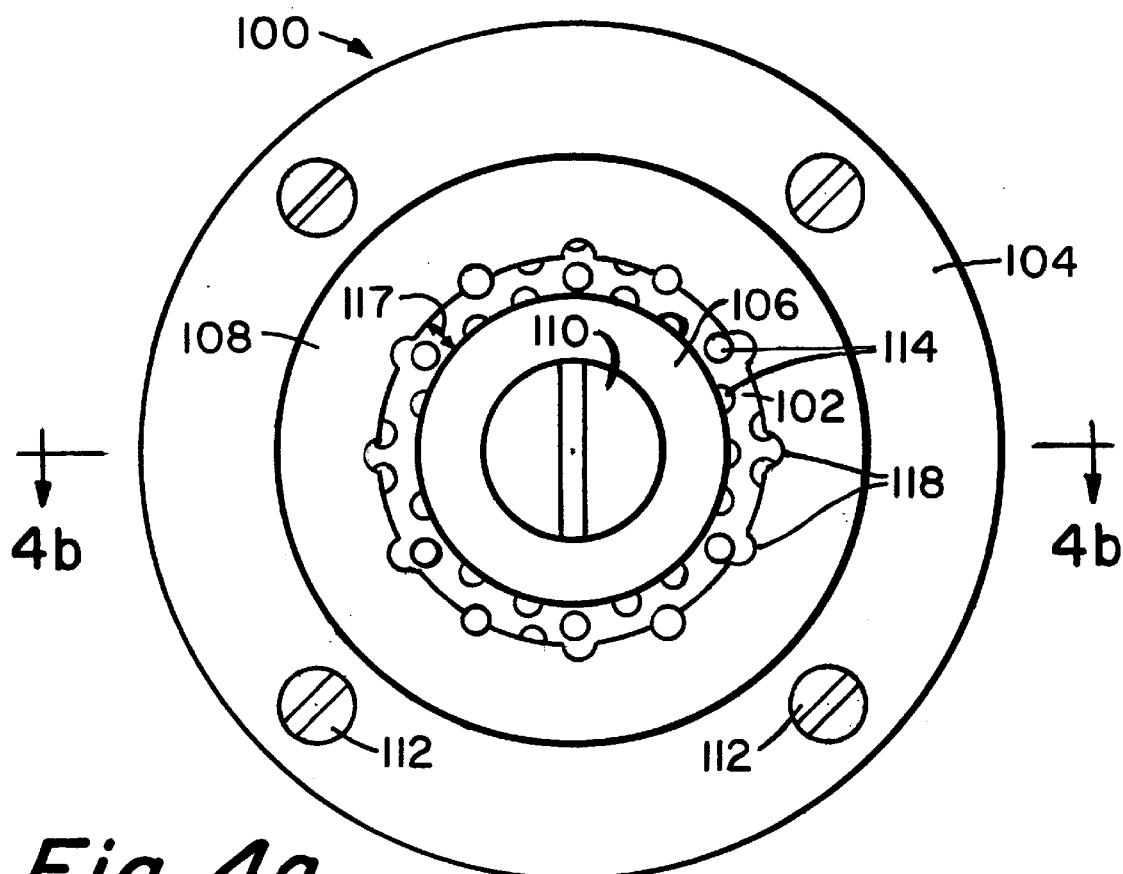
FIGS. 4a and 4b are respectively, bottom plan and side elevational cross sections of a die assembly useful for extruding a hollow tube member used in the practice of the present invention.
Figure 4B:
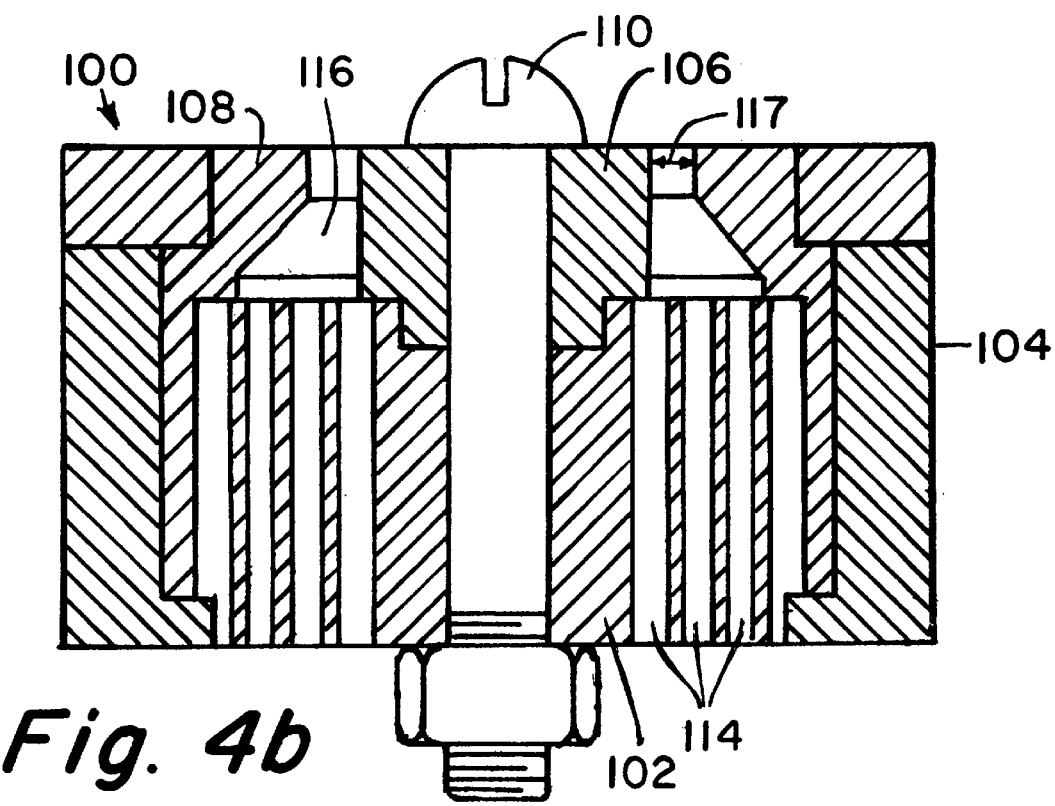

One useful apparatus for forming the tube is an extrusion die of the type schematically illustrated in FIGS. 4a and 4b. FIGS. 4a and 4b show, respectively, bottom plan and side elevational cross sections of a die assembly useful for this purpose.

As shown in FIGS. 4a and 4b, a die assembly (100) comprises a die body (102) positioned within a housing (104). The assembly includes a tube bore-forming element (106) and a tube wall-forming element (108), joined to the die body by means of central bolt (110) and housing assembly screws (112), respectively, those elements providing the surfaces for forming the bore and wall surfaces of the tubular member during extrusion. The die body is provided with a plurality of apertures (114) which supply material for the green tubular member, such as the cordierite or beta-spodumene raw material batches above described, into recess (116) between element 106 (also termed an ID-former) and element 108 (also termed an OD-former). Apertures (114) are of sufficient length/diameter ratio to promote alignment of batch particles where needed to develop anisotropic properties in the tube wall.

From recess (116) the raw material batch is extruded from the die through gap (117) between the ID-former and OD-former, thereupon being shaped by those formers into the desired tube. Grooves (118) in OD-former (108) may optionally be provided to form projecting ribs on the tube as it is extruded, if desired.

The die may be formed of any suitable hard material, but is typically fabricated of a metal such as steel. The formers (106) and (108) may be sized to form a gap for any desired tube wall thickness, and can if necessary be sufficiently closely spaced if desired. In a specific preferred embodiment, gap (117) has a cross-sectional area which is approximately 85% of the combined cross-sectional area of apertures (114), in order to develop a back-pressure within recess (116) which encourages effective knitting of the batch material as it is forced through the gap.

Before the member is inserted into the honeycomb, the member and honeycomb are dried.

The member is then inserted into the green honeycomb. The honeycomb itself can have one or more already formed openings, or it can be without an opening at this point. However, it is preferred that the honeycomb have an opening and typically the opening is in the center of the honeycomb.

The organic binders at the surfaces of the member and honeycomb that are to be joined are first softened to impart a degree of tackiness and deformability to allow the surfaces to adhere uniformly to each other. Depending on the binder this is done preferably by wetting those surfaces with a material such as water that is a solvent for the binder used. This can be done by any technique.

The green member is then inserted into the honeycomb. If the honeycomb has no center opening, the member can be pushed into and through the chosen spot (usually the center) of the honeycomb allowing the honeycomb cells adjacent to the member to be deformed in order to make the opening. If the honeycomb has an already formed opening, the opening has a diameter that is slightly less than the outside diameter of the member.

In accordance with a preferred embodiment, the green member in the shape of a tube is inserted into the honeycomb by first mounting it on a mandrel. The mandrel is made of any materials such as metal, e.g. aluminum because of its low cost, or wood, etc. that is strong enough to push the member into the honeycomb without being deformed itself.

Figure 2:
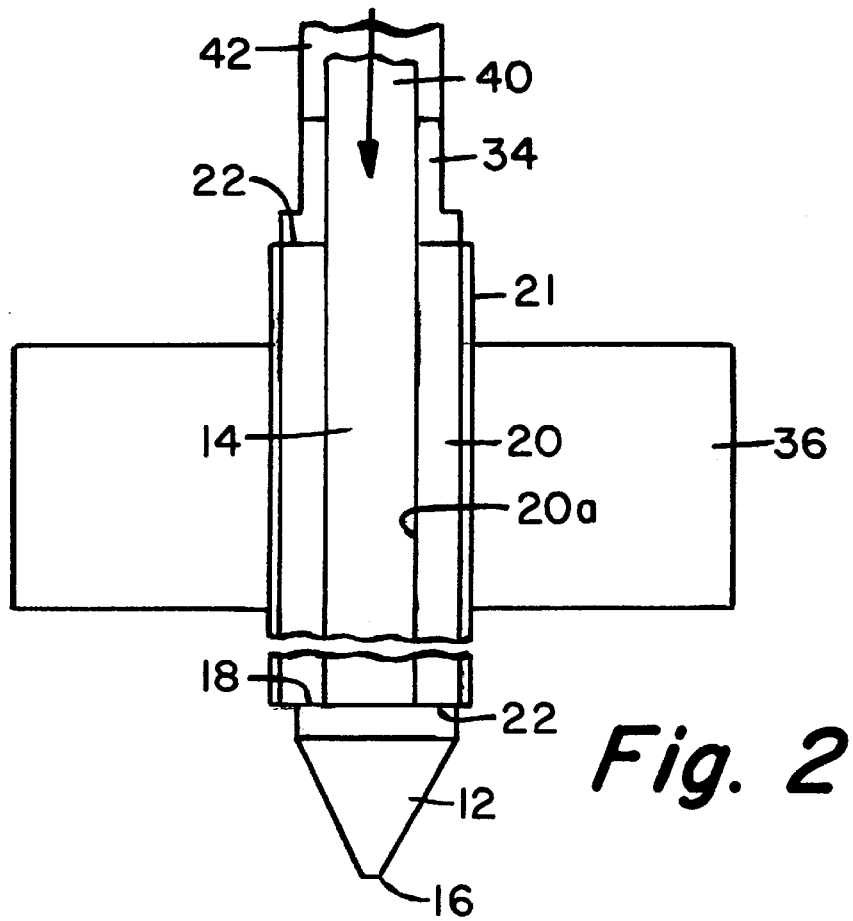
FIG. 2 is a schematic diagram of a tube mounted on a mandrel shown inserted into a honeycomb.

FIG. 1 is a schematic diagram showing a mandrel (10). FIG. 2 is a schematic diagram showing a tube mounted on a mandrel after insertion into the honeycomb. The mandrel is made in two parts: a cone (12) which can be pointed or truncated, having a vertex end (16), and a base end (18) opposite the vertex end; and a stem (14) having an anterior end (40a) attached to the conical base, and a posterior end (40). The tube is shown as (20) with its inner surface shown as (20a), its opening as (23) and the area surrounding the opening as (22). The tube itself can have a ribbed outer surface as shown in FIG. 1a which is a top plan view depicting the ribs as (21). Or it can have a smooth outer surface shown as (24) in FIG. 1b which is an alternate view. The area surrounding the opening is shown as (22a). The diameter of the base end of the cone is slightly less than the outer diameter (OD) of the tube. The diameter of the stem is less than the diameter of the conical base, and sufficiently smaller than the inner diameter of the tube so that the tube can fit over the stem and be held in place by the stem.

Softening is carried out by softening with a solvent or softening agent such as water or plasticizer, the surfaces of the honeycomb to be joined with the tube. For honeycombs with an opening, one technique is to close one end of the opening such as by taping it. It is then filled with the softening agent. At same time the cone of the mandrel and the outer surface of the tube are wetted with the softening agent. Excess agent is then removed from all the wetted parts.

FIG. 1 shows honeycomb (36) having a pre-made opening shown as (28) and the cells surrounding the opening as (30). Alternately, there can be no pre-made opening. The vertex of the cone is shown positioned proximal to the point where the tube is to be inserted.

A force, the direction of which is shown by the arrows in FIG. 2, is applied to the posterior end (40) of the mandrel stem. Preferably the mandrel stem extends beyond the length of the tube. The force can be applied by any technique that will allow the tube to be inserted into the honeycomb with minimum deformation of the honeycomb cells that border the joining area, and the invention is not limited to any one technique. For example, a press shown as (42) in FIG. 2 applies pressure to a collar (34) which allows even pressure to be applied to the tube and stem. Another method would allow the tube and mandrel to be rotated during insertion. The mandrel is then removed. Portions of the tube extending out of the honeycomb can be cut off (typically after firing) to conform to the length of the honeycomb.

The assembly is dried and fired to cause the particles to sinter. The firing is done in the normal manner by placing the assembly in a furnace and heating it at a rate slow enough to prevent breakage due to thermal shock, to a temperature high enough to cause the material particles to sinter and convert to the phase or phases desired in the end product. The firing conditions vary depending on the material, shape and size of the assembly.

Figure 3:
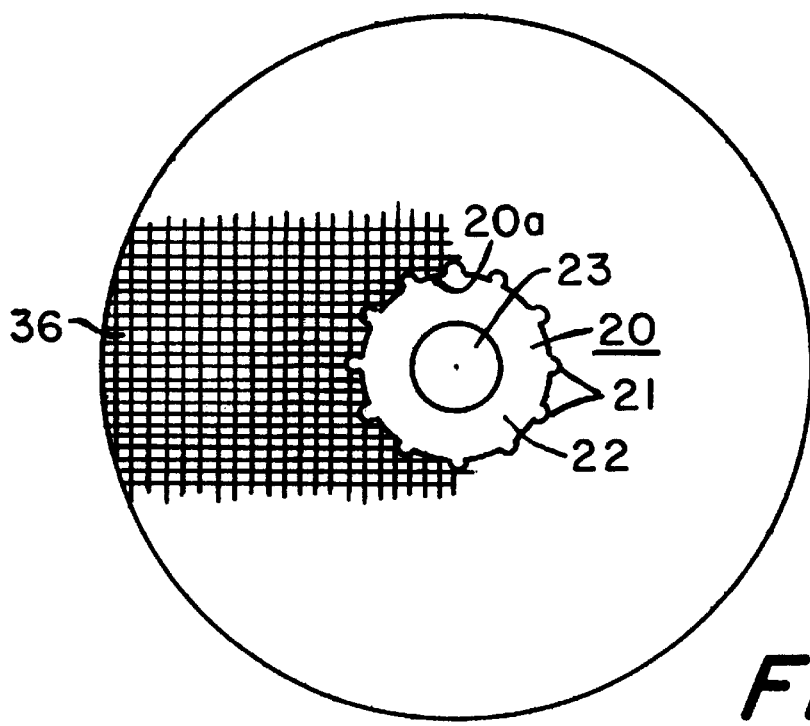
FIG. 3 is a schematic diagram of a top plan view of a honeycomb having an inserted tube shown inserted into a honeycomb.

The resulting honeycomb with the opening extending therethrough, is a monolithic structure with a sinter bond between the honeycomb and the tube. As a result it is expected to be stronger than those in which the member is bonded to the honeycomb with bonding material. FIG. 3 is a schematic diagram of a plan view of a honeycomb (36) having an inserted tube (20).

Among the contemplated uses, the monolithic honeycomb is especially useful as a regenerator wheel, the center opening being called a hub, for catalytic and heat exchange applications.

To more fully illustrate the invention, the following non-limiting examples are presented. All parts, portions, and percentages are on a weight basis unless otherwise stated.

Example

A green honeycomb is provided which is made of materials which when fired will form cordierite. A hole is drilled through the center of the honeycomb along its length using a 2.22 cm (⅞") wood drill bit to produce a hole of that size. A green hub of the same materials as the honeycomb and with an OD of about 2.54 cm (1") was mounted onto a mandrel made up of a cone having a conical tip with an OD of about 2.42 cm (0.954"), a second section (FIG. 1) with an OD of about 1.43 cm (9/16") which fits the ID of the hub and holds it in alignment, and a third section (FIG. 1) having an OD of about 0.32 cm (⅛"), a cylindrical pusher having an OD of about 3.18 cm (1.25") and an ID of about 1.03 cm (13/32") and about 10.16 cm (4") in length. The pusher fits over the core and bears against the hub when the hub is placed on the core for insertion. The bottom of the hole was taped closed and the hole was filled with water for about 15–30 seconds. At the same time, the hub on the mandrel was dipped in water for the same length of time. Then the tape was removed from the hole and the water was removed from the hole and the hub. The mandrel and hub were pushed into the hole in the honeycomb, crushing the prewetted cells of the hole perimeter. The mandrel parts were then slipped out. The assembly of honeycomb and hub were dried for about 6 minutes in a dielectric drier. The assembly was then fired on a standard cycle. The result was a monolithic structure with no visible joining line between the hub and the nearby honeycomb cells. A number of monoliths assembled as described were tested for strength by applying force directly to the member until failure. The minimum failure load on the axial member is about 519.5 kg (about 1143 lb).

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of fabricating a monolithic honeycomb structure, the method consisting essentially of:
   a) shaping a first mixture comprising raw materials and a binder into a green honeycomb;
   b) extruding a second mixture comprising raw materials and a binder into one or more green members wherein said one or more green members each define an opening extending longitudinally therethrough, and wherein the raw materials of the second mixture are compatible with the raw materials of the first mixture;
   c) drying said green honeycomb and said one or more green members;
   d) softening the binders of said green honeycomb and of said one or more green members at the surfaces that are to be bonded in step e;
   e) inserting said one or more green members into said honeycomb to bond said one or more green members to said honeycomb and form an assembly thereof; and
   f) drying and firing said assembly to form a unified monolithic honeycomb structure product.

2. A method of claim 1 wherein the first mixture and the second mixture are identical in composition.

3. A method of claim 2 wherein said first mixture and said second mixture form predominately phases selected from the group consisting of cordierite and beta-spodumene.

4. A method of claim 1 wherein said raw materials of said first and second mixtures comprise ceramic materials.

5. A method of claim 4 wherein on firing, said raw materials form ceramic materials selected from the group consisting of cordierite and beta-spodumene.

6. A method of claim 1 wherein said one or more green members are extruded in the shape of tubes.

7. A method of claim 1 wherein said green honeycomb defines an opening into which a green member in the shape of a tube is inserted, wherein the diameter of said opening of said honeycomb is smaller than the outer diameter of said tube.

8. A method of claim 7 wherein the opening in said honeycomb is in the center of said honeycomb.

9. A method of claim 7 wherein steps d and e are carried out by a procedure comprising the steps of:
   i) providing a mandrel comprising
      a cone having a vertex end and a base end opposite the vertex end, wherein the diameter of the base end is slightly less than the outer diameter of said tube, and
      a stem cylindrical in shape, having an anterior end and a posterior end, wherein the anterior end is attached to the base of said cone, and said stem having an outer diameter that is less than the diameter of the conical base, and sufficiently smaller than the inner diameter of said tube to allow said inner diameter of said tube to fit over said stem;
   ii) mounting said tube on the stem of said mandrel;
   iii) softening the outer surface of said tube and the surface of said honeycomb defining said honeycomb opening;
   iv) forcing said mandrel and said tube into said opening in said green honeycomb to bond said tube to said honeycomb at the softened surfaces and form an assembly of said green honeycomb and said green tube; and
   v) removing said mandrel from said assembly.

* * * * *